J. C. RADER.
SHOCKING ATTACHMENT FOR HARVESTERS.
APPLICATION FILED JUNE 18, 1919.
1,360,683.
Patented Nov. 30, 1920.
4 SHEETS—SHEET 1.
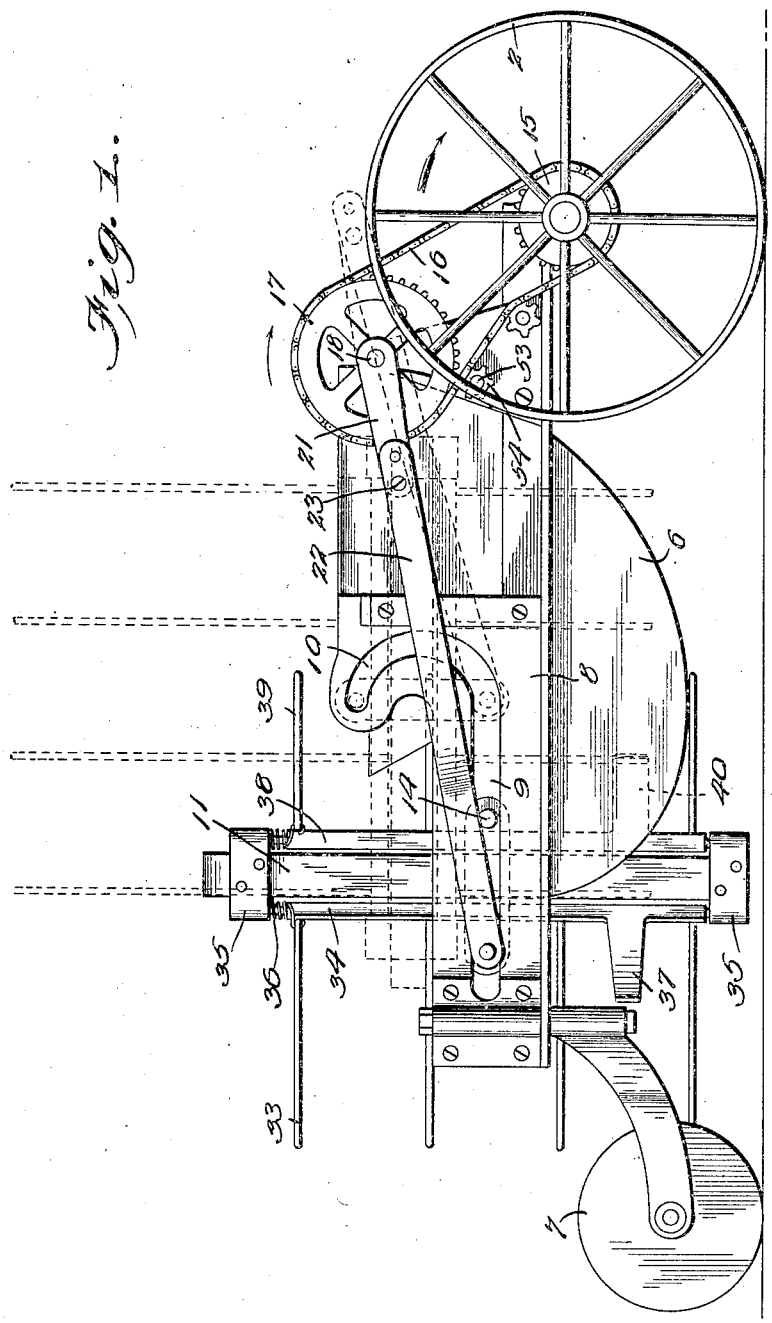
WITNESSES
INVENTOR
J. C. Rader,
BY
ATTORNEYS

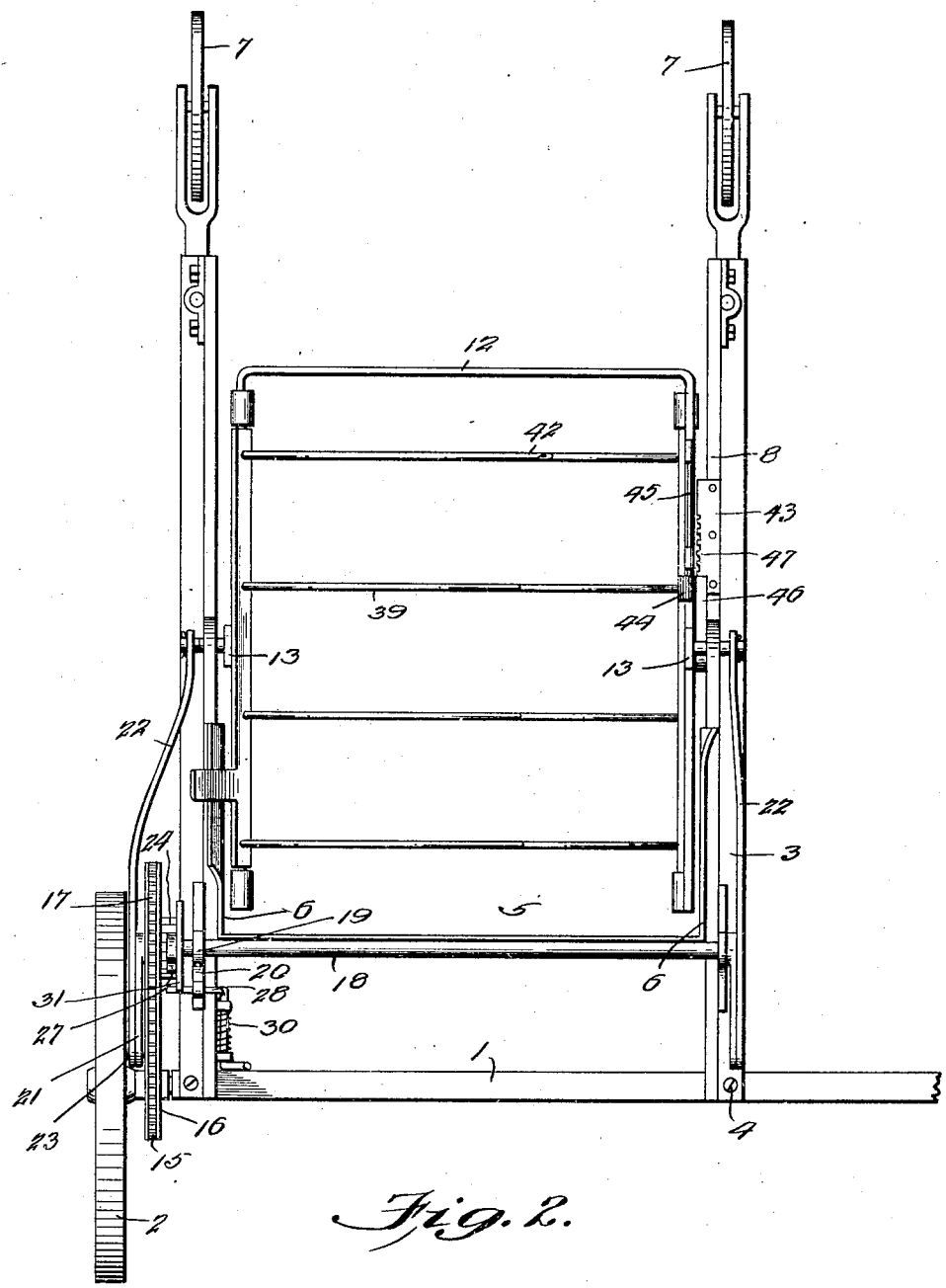

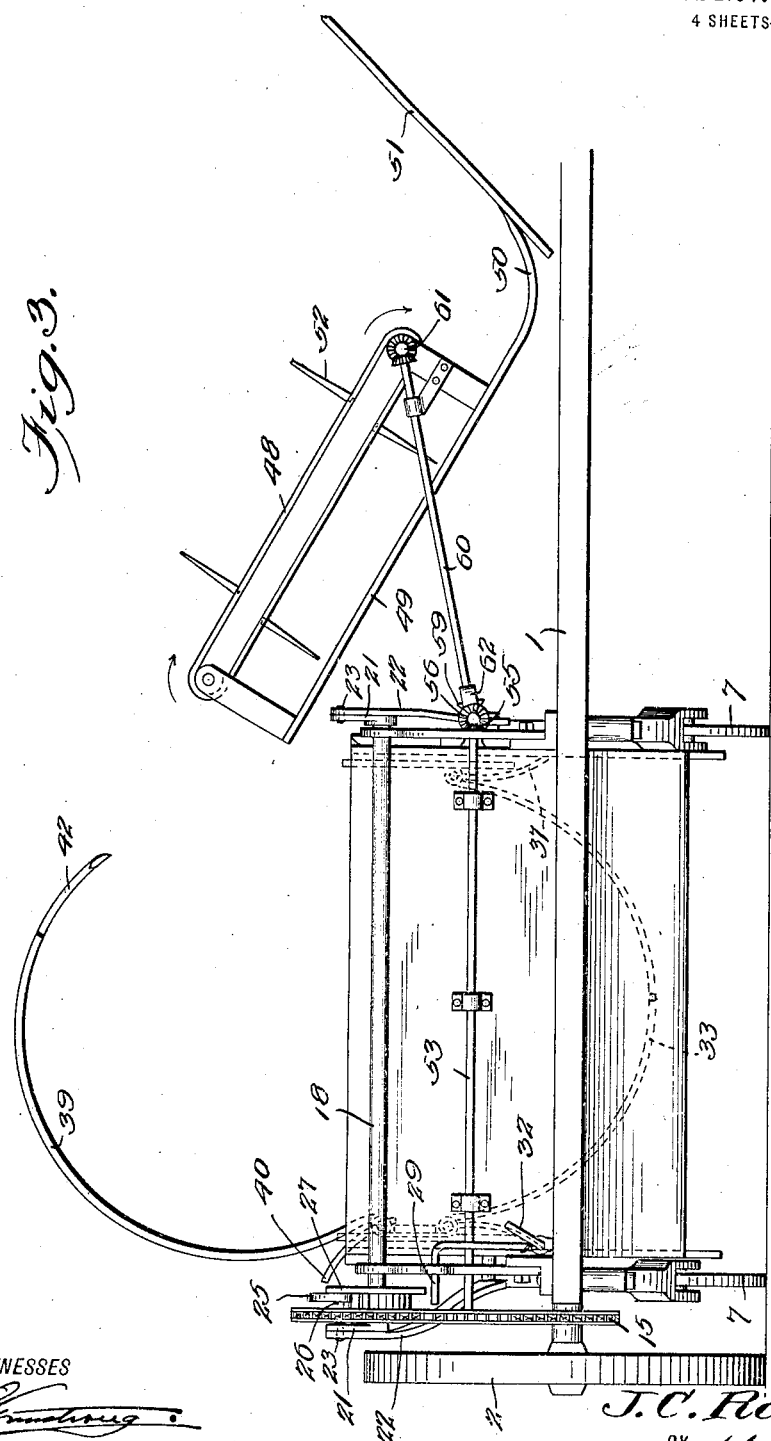

J. C. RADER.
SHOCKING ATTACHMENT FOR HARVESTERS.
APPLICATION FILED JUNE 18, 1919.
1,360,683.
Patented Nov. 30, 1920.
4 SHEETS—SHEET 4.
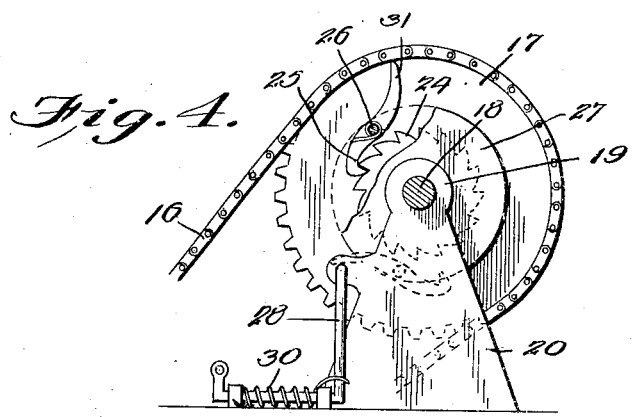
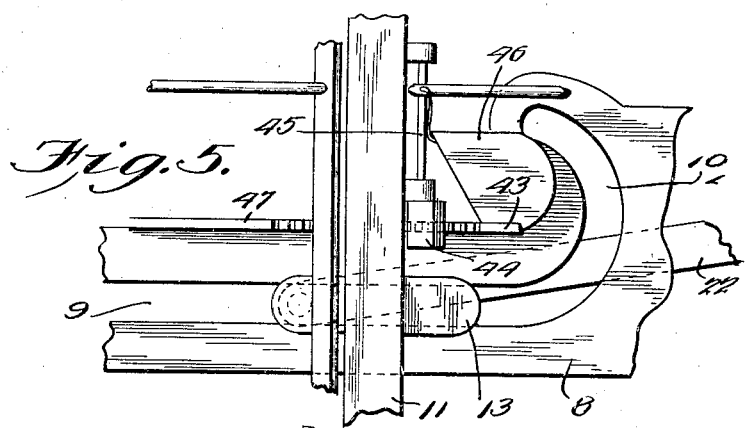
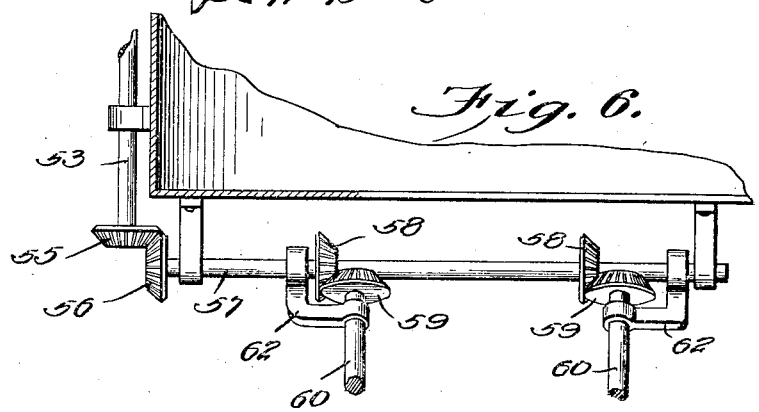
WITNESSES
INVENTOR
J. C. Rader.
BY
ATTORNEYS

UNITED STATES PATENT OFFICE.

JOHN C. RADER, OF CANDO, NORTH DAKOTA.

SHOCKING ATTACHMENT FOR HARVESTERS.

1,360,683.  Specification of Letters Patent.  Patented Nov. 30, 1920.

Application filed June 18, 1919. Serial No. 305,054.

*To all whom it may concern:*

Be it known that I, JOHN C. RADER, a citizen of the United States, and a resident of Cando, in the county of Towner and State of North Dakota, have invented certain new and useful Improvements in Shocking Attachments for Harvesters, of which the following is a specification.

This invention relates to an improvement in shocking machines for shocking wheat and other grain cut by a harvester.

One of the principal objects of the invention is to provide an improved shocking machine adapted to be attached to the harvester in place of the original bundle carrier, for receiving the bundles from the harvester, tying them together and forming the shock, and then depositing them on the ground butt end first.

Another object of the invention is to provide a tilting cradle whereon the bundles are deposited and tied, the cradle being movable from a horizontal bundle receiving position, to a vertical shock discharging position, and furthermore having a movement rearwardly with respect to the direction of travel of the machine whereby to remain stationary with respect to the ground while the shock is being deposited thereon.

Another object is to provide a cradle having a pair of series of fingers which form a support for receiving the bundles and which, when the shock is deposited vertically on the ground, open out to allow the machine to move away from the shock without disturbing the position of the latter.

Another object of the invention is to provide means for driving the shock former from one of the ground wheels of the machine, and to provide means for controlling the operation of the shock former.

A further object of the invention is to provide an improved shocking machine which will be relatively simple, durable, efficient in operation and inexpensive to manufacture and maintain.

With these and other objects in view, which will become apparent as the description proceeds, the invention resides in the construction, combination and arrangement of parts hereinafter more fully described and claimed, and illustrated in the accompanying drawings in which like characters of reference indicate like parts throughout the several figures of which:

Figure 1 represents a side elevational view of the shocker, the parts being shown in full lines in shock depositing position, and in dotted lines in bundle receiving position.

Fig. 2 represents a top plan view of the machine, the parts being shown in bundle receiving position, the conveyer and driving means therefor being left out of the figure for clearness of illustration.

Fig. 3 represents a front elevational view, the parts being in bundle receiving position.

Fig. 4 represents an inside elevational view of the ratchet clutch and associated parts whereby the operation of the shocker is controlled.

Fig. 5 represents a fragmentary inside elevational view, in detail, showing the rack and pinion for operating the knotter.

Fig. 6 represents a fragmentary plan view of the gearing for driving the conveyer.

Referring more particularly to the drawing, 1 indicates part of the main frame of a harvesting machine, carrying a supporting ground wheel 2 toward the stubbleward side of the machine. The frame of the shock former includes the side bars 3 connected at their forward ends to the main frame at 4 and supporting between them a transverse apron 5 having sides 6 attached to the bars 3. The rear ends of the side bars are supported by wheel casters 7.

Supported on the bars in coplanar relation with the sides of the apron, are the guides 8. These guides are longitudinally slotted as at 9, the forward ends of the slots being curved upwardly in the form of a semi-circle as at 10. The slots are thus shaped substantially like the letter J, and are adapted to guide the lugs carried by the bundle receiving cradle, whereby the movement of the cradle from a horizontal bundle receiving position (shown in dotted lines in Fig. 1 and full lines in Fig. 2), to a vertical shock discharging position (shown in full lines in Fig. 1), is effected.

The cradle includes a U-shaped frame having sides 11 connected by a bar 12. This frame is positioned within the main frame of the shock former. Intermediate their ends each of the sides 11 of the cradle frame is provided with cross arms 13 which extend beyond the edges of the said sides 11, and which carry outwardly extending spaced lugs 14 which fit into and are guided by slots 9. The distance between the members of each pair of guide lugs 14, coincides substantially with the diameter of the circle of which the curved portions 10 of the guide slots form an arc. It will thus be seen that if the frame 11 be moved forward from the full line position shown in Fig. 1, that is toward the curved ends of the guide slots, the lugs moving in these slots will effect a rotary movement of the cradle frame, bringing it from a vertical position to a horizontal position when the lugs have reached the limit of their movement.

A movement of the cradle frame backward and forward with respect to the main frame of the shock former, and the consequent rotary movement of the cradle frame, is effected by the following mechanism: The ground wheel 3 carries a sprocket 15 which drives a chain 16 running over a clutch sprocket 17 rotatably mounted on one end of a shaft 18, which shaft is mounted in bearings 19 carried on brackets 20 forward of the apron 5. On the ends of the shaft 18 are keyed, or otherwise secured, alined crank arms 21 to which the forward ends of connecting rods 22 are pivoted as at 23. The rear ends of these connecting rods are pivotally mounted on the rearmost members of the pairs of guide lugs 14. It will thus be seen that if the shaft 18 was rotated continuously in one direction, for instance, in the direction indicated by the uppermost arrow in Fig. 1, reciprocatory motion will be transmitted, through the operation of the cranks and connecting rods, to the cradle frame. Drive from the sprocket 17 to the shaft 18 is delivered through a ratchet 24, carried by and constantly rotating with the sprocket, and a pawl 25, pivotally mounted at 26 on a circular plate 27, which is fixed to the shaft 18. The spring tends to maintain the pawl 25 in engagement with the ratchet 24. The pawl being in engagement with the ratchet, the drive will go from the sprocket 17 through the ratchet and the pawl and the plate 27 to the shaft 18.

In order to disengage the pawl from the ratchet, and thereby allow continued rotation of the ground wheel 2 without driving the shock former, a stop 28 is provided. This stop is in the form of a lever pivotally mounted in suitable bearings, and having a nose 29 normally projecting, under the action of a spring 30, with which the lever is equipped, into the path of the tail 31 of the pawl 25. The handle 32 for manually withdrawing the lever from its pawl engaging position, is provided. Since the pawl rotates bodily with plate 27, it will in following its path, move into a position where the nose of the lever will engage the tail of the pawl, thereby shifting the pawl out of engagement with the rack, as indicated in dotted lines in Fig. 4. When this occurs the sprocket and the ratchet will continue rotating under the drive from the chain 16, but the power having been disconnected from the plate 27, the shaft will cease rotating, and hence the shock former will run stationary. While the bundles are being deposited onto the shock former, which I may state will ordinarily accommodate from ten to a dozen bundles, the pawl will be held out of engagement with the ratchet. The desired number of bundles having been deposited on the shocker, it is only necessary, in order to deliver drive to the shocker for forming and tying the shock and depositing the same, to pull the handle 32 of the lever, thereby releasing the pawl and allowing it to engage with the ratchet, and thus couple up the rotating ratchet with the shaft so that the latter will be driven. The lever having been pulled may be immediately released, and the shocker under the influence of its driving mechanism, will automatically perform the operations of forming and tying and delivering the shock, and returning to its first position, the arrangement being such that a complete cycle of operations of the shocker will take place during one revolution of the shaft 18. When the shocker is again returned to normal position for receiving the bundles, the pawl will have completed one revolution and will have again become engaged by the lever whereby to be turned out of engagement with the ratchet, thereby again disconnecting the drive.

The cradle includes a pair of series of bundle receiving fingers, which coöperate in receiving the bundles from the harvester, supporting them during the movement of the cradle in the shock depositing position and then opening out thereby to disengage the shock and allow the machine to move forward away from the deposited shock. Each of the two series of fingers 33 is carried on a bar 34 which is rotatably mounted at its ends in bearings 35 adjacent the ends of the sides 11 of the U-shaped cradle frame. There are two of the members 34, each of which is thus rotatably mounted in parallel relation with respect to one of the sides of the cradle frame. The members 34 are spring tensioned by the action of coiled springs 36, the tendency of the springs being to rotate the members outwardly, and hence rotate the two series of curved supporting fingers 33 away from each other. When the shocker is in bundle receiving position, these series of fingers are held in what I will term closed position, that is in such position as to receive and support the bundles, through the action of arms 37 which extend laterally from the members 34 and bear against the inner surfaces of sides 6 of the shocker. This action of the arms 37 in maintaining the fingers in bundle receiving position will be readily understood by an inspection of Fig. 3, in which the arms are shown as engaging against the side walls 6 and an inspection of Fig. 1 in which it is shown how the arms move from beyond the rear ends of the side walls when the shocker is in shock depositing position, thereby allowing the springs 36 to swing the supporting fingers away from each other in order to disengage them from the shock when it has been deposited and allow the machine to move forward. As the cradle moves forward into shock receiving position, the ends of the arms 37 engaging the side walls 6 rotate the supporting fingers back into bundle receiving position, a sliding contact being had between the outer ends of the arms 37 and the inner surfaces of the walls 6.

A third series of fingers, which I have already referred to as the shock former, are carried on a similarly mounted member 38 on the opposite side of the cradle frame from that on which the members 34 are carried. These shock forming fingers 39, are substantially semi-circular in shape, while the fingers 33 are in shape of a quarter circle, curvature of the supporting fingers and the shock forming fingers however being substantially the same. The member 38 is also spring tensioned; the tendency being to maintain the fingers in outward or raised position indicated in Fig. 3. The arm 40 for effecting the operation of the shock forming fingers 39, is carried by the member 38. This arm similarly with the arm 37, has a sliding contact against the inside face of one of the side walls 6, during the movement of the shocker from bundle receiving to shock depositing position. When in bundle receiving position, as will be noted from inspection of Fig. 3, the arm 40 projects above the upper edge of the side wall, thereby allowing the spring tensioned member 38 to maintain the fingers 39 in receiving position. As soon however as the cradle starts to move downwardly and rearwardly the arm in contacting with the side wall will swing the fingers 39 downwardly, thus engaging over the bundles deposited on the fingers 33, and thereby tightening the bundles together in a compact mass. The fingers 39 will be retained in this shock engaging position, until the cradle is returned to bundle receiving position, and the end of the arm shall have passed up beyond the upper edge of the side wall 6. This edge is provided with an out curved portion as at 41 shown clearly in Fig. 2, for co-acting with the arm 40 in securing a smooth even movement of the fingers 39.

One of the fingers 39, is extended as at 42 and provided with an eye, whereby to act as a twine carrier for extending the binding twine around the bundles supported in the cradle. This extension, or needle 42, passes the twine over the bundles to the knotter, which knotter is operated through the medium of a rack and pinion. As clearly indicated in Fig. 5, a horizontal rack 43 is carried by one of the guides 8, and this rack cooperates with the segmental pinion 44, which is rotatably mounted in bearings on the side 11 of the frame opposite the side on which the member 38, carrying the fingers 39, is mounted. The pinion operates a shaft 45, which is arranged in substantially parallel relation to the said member and through the medium of which the knotter, which I have not disclosed in detail, is operated. The pinion 44 is flattened on one side, and when the cradle is in bundle receiving position, this flattened surface of the pinion lies against the flat end of the rack 43. When in this position the teeth of the pinion are out of engagement with the teeth of the rack. As the cradle moves downwardly and rearwardly into shock discharging position, the pinion slides along the surface 46 in a downwardly and rearwardly curving path until the teeth of the pinion engage in the first teeth of the rack. This will occur at the moment the cradle is first moved into vertical position, and after the needle has brought the twine around the bundles. The continued bodily rearward movement of the cradle carries the pinion along the rack, thus causing rotation of the pinion and the knotting of the twine. At the completion of the knotting process the pinion will have reached the rear end of the rack and the flattened side of the pinion will have come into contact with the flattened portion 47 of the rack at the rear end of the latter, and hence further rotation of the pinion and consequent action of the knotter will be discontinued. After the shock has been deposited, and as the cradle moves forward to normal position the pinion will again engage with the rack and in rotating move the knotter to assume its normal position.

From the foregoing description taken in connection with the drawings, it is believed that the operation of the shocker will be readily understood. It is to be noted that as the shocker moves downwardly and rearwardly, it forms the shock and ties it, and after having assumed a vertical position, a bodily rearward movement of the cradle, with respect to the main frame of the shocker, occurs, and hence the cradle will remain relatively stationary with respect to the ground, while the supporting fingers open away from the shock to allow disengagement thereof. This relatively stationary position of the cradle with respect to the ground occurs, of course, because the main frame of the shocker is continuously moving forward, and as the proportion of the parts is such that the rearward movement of the cradle relatively to the main frame of the shocker, will correspond to the forward movement of the shocker relatively to the ground, the result will be that for a few seconds, and during the time that the supporting fingers are opening to deliver the shock the cradle will remain stationary with respect to the ground.

In order that the bundles may be delivered from the deck of the harvester to the shock former I utilize an endless conveyer 48, arranged on one side of the shocker, and between the same and the deck of the harvester, such conveyer being carried on a suitable frame including a flat or smooth surfaced base 49. The outer end of this base is curved as at 50 to guide the bundles from the deck 51 of the harvester into a position to be engaged with the fingers 52 of the conveyer whereby to be delivered one at a time onto the supporting fingers 33 of the shock former. The conveyer is driven from a chain 16 through the medium of a shaft 53 mounted on the forward face of the apron, such shaft having a sprocket wheel 54 meshed with the chain. The opposite end of the shaft 53 has a beveled pinion 55 meshing with a beveled pinion 56 on a shaft 57 arranged at right angles to the shaft 53 and carried in bearings on the side of the shock former. This shaft 57 carries beveled pinions 58 meshing with pinions 59 on shaft 60 arranged at right angles to the shaft 57 and which in turn drives one of the shafts of the conveyer through the medium of beveled pinions 61. The lower ends of the shaft 60 are supported in right angular bearing members 62 which rotatably engage the shaft 57, whereby the whole conveyer may be shifted from the position indicated in Fig. 3 to a position above the shock former, whereby to allow access for oiling, repairs, etc., to those portions of the mechanism, underlying the conveyer, which would be relatively inaccessible were the conveyer in normal position.

In operation the bundles are delivered from the harvester to the shock former through the action of the conveyer, said bundles being delivered to the shock former with their butt ends toward the front. The desired number of bundles having been delivered, the operator releases the lever which normally maintains the ratchet clutch in disengaged position. The drive will then be delivered from the ground wheel to the mechanism for operating the shock former. As the cradle starts to move from its horizontal position to a vertical position, the shock engaging fingers will descend, thus tightening the bundles together in a compact form, and at the same time stretching the securing twine over them into position to be engaged by the knotter. The operating shaft 18 will move through a quarterly revolution in bringing the cradle from its horizontal bundle receiving position to a vertical position. The next quarter revolution of the shaft will effect the bodily rearward movement of the cradle relatively to the body of the shocker, thus securing the operation of the knotter, and the outward movement of the supporting fingers relatively to each other effect disengaging the shock. The next quarter revolution of the shaft will move the cradle bodily forward, in its vertical position, relatively to the frame of the shocker, and this movement will effect the closing of the supporting fingers into their normal position. The final quarter revolution of the shaft will effect the rotary motion of the cradle from vertical to horizontal position, allowing the shock engaging fingers to move outwardly into normal position for allowing the bundles to be delivered into the cradle and onto the bundle supporting fingers. The parts will then have returned to the position from which they started, the clutch will have again been thrown out, thus allowing the shock former to remain in this position to receive another set of bundles for forming the next shock.

Although I have described the preferred embodiment of my invention, I may desire to make such changes in the construction, combination and arrangement of parts thereof, as do not depart from the spirit of the invention and the scope of the appended claims.

I claim:—

1. A shock forming machine including guide plates provided with substantially horizontal guide slots having upwardly curved forward ends, a cradle including a frame disposed between the guide plates and having spaced guide lugs engaging in the slots, a drive shaft, means between the drive shaft and one of the lugs for translating the rotary motion of the shaft to a reciprocatory motion of the lugs, a ground wheel and clutch controlled drive means between the ground wheel and the drive shaft.

2. A shock forming machine including a main frame, a cradle frame, guides on the main frame in which the cradle frame is slidably mounted, means for reciprocating the cradle frame through the guides, coöperating means between the cradle frame and guides for moving the former through an angle of approximately 90 degrees at one end of its path of movement, a pair of oppositely disposed bundle receiving fingers hingedly mounted on one side of the cradle frame and movable between a position for receiving bundles and a position for disengaging bundles, spring means normally tending to hold the fingers in disengaging position, and coöperating means between the bundle receiving fingers and the sides of the main frame for normally holding the fingers in receiving position and for allowing release of the fingers as the frame approaches the opposite end of its path of movement.

3. In a shock forming machine, a main frame, a cradle movable from a relatively horizontal bundle receiving to a relatively vertical shock discharging position, supporting fingers carried by and movable relatively to the cradle from bundle supporting to bundle releasing position, spring means for moving said supporting fingers to bundle releasing position, coöperating fingers carried by and movable relatively to the cradle from bundle receiving to shock forming position coacting with said supporting fingers to completely encircle the bundles and form the shock, spring means for moving said shock forming fingers to bundle receiving position, means coöperating between said coöperating fingers and said main frame to move said coöperating fingers to shock forming position when said cradle is moved from bundle receiving to shock forming position, and means coöperating between said supporting fingers and said main frame to maintain said supporting fingers in bundle supporting position during bundle receiving and shock forming operation.

4. In a shock forming machine, a main frame, a cradle movable from a relatively horizontal bundle receiving to a relatively vertical shock discharging position, supporting fingers carried by and movable relatively to the cradle from bundle supporting to bundle releasing position, coöperating fingers carried by and movable relatively to the cradle from bundle receiving to shock forming position coacting with said supporting fingers to completely encircle the bundles and form the shock, spring means for moving said shock forming fingers to bundle receiving position, means coöperating between said coöperating fingers and said main frame to move said coöperating fingers to shock forming position when said cradle is moved from bundle receiving to shock forming position, and means for maintaining said supporting fingers in bundle supporting position during bundle receiving and shock forming operation.

5. In a shock forming machine, a main frame, a cradle movable from a relatively horizontal bundle receiving to a relatively vertical shock discharging position, supporting fingers carried by and movable relatively to the cradle from bundle supporting to bundle releasing position, coöperating fingers carried by and movable relatively to the cradle from bundle receiving to shock forming position, coacting with said supporting fingers to completely encircle the bundles and form the shock, means coöperating between said coöperating fingers and said main frame to move said coöperating fingers to shock forming position when said cradle is moved from bundle receiving to shock forming position, and means coöperating between said supporting fingers and said main frame to maintain said supporting fingers in bundle supporting position during bundle receiving and shock forming operation.

6. A shock forming machine including a cradle movable between bundle receiving and shock discharging positions, a rack with respect to which the cradle moves, and a knotter operating means including a segment coöperating with the rack in operating the knotter during the movement of the cradle.

7. A shock forming machine including a cradle movable between bundle receiving and shock discharging positions, ground wheel operated means for actuating the cradle including a ratchet clutch through which the drive is transmitted from the ground wheel, said clutch including a pawl, stop means engageable with the pawl to automatically disconnect the same when the cycle of operation has been completed and normally maintaining the pawl in disconnected position, said stop means being operable for releasing the pawl at will, substantially as described.

8. A shock forming machine including guide plates provided with substantially horizontal guide slots having upwardly curved forward ends, a cradle including a frame disposed between the guide plates and having spaced guide lugs engaging the slots, a drive shaft, and means between the drive shaft and one of the lugs for translating the rotary motion of the shaft to a reciprocatory motion of the lugs.

9. In a shock forming machine, a main frame, a cradle movable from a relatively horizontal bundle receiving to a relatively vertical shock discharging position, a pair of shafts journaled on said cradle, supporting fingers carried by each of said shafts and movable relative to the cradle from bundle supporting to bundle releasing position, spring means mounted on the shafts for moving said supporting fingers to bundle releasing position, an arm fixed to each of said shafts and engageable with said frame to normally retain the fingers in supporting position against the action of said spring means, said arm being adapted to be disengaged from said frame to permit the spring means to move the fingers into bundle releasing position during the shock discharging operation.

10. In a shock forming machine, a main frame, a cradle movable from a relatively horizontal bundle receiving position to a relatively vertical shock discharging position, supporting fingers carried by and movable relatively to the cradle from bundle supporting to bundle releasing position, spring means for moving said supporting fingers to bundle releasing position, means including an arm connected with said supporting fingers and engageable with said frame to normally retain the fingers in supporting position against the action of said spring means, said arm being adapted to be disengaged from said frame to permit the spring means to move the fingers into bundle releasing position during the shock discharging operation.

11. A shock forming machine including a cradle movable from the bundle receiving to the shock discharging position and consisting of a U-shaped frame, bearings carried by the sides of said frame, a shaft journaled in each of said bearings on opposite sides of the cradle, a pair of series of curved supporting fingers, the members of the pairs being each carried one by the shaft on one side of the frame and the other by the shaft on the other side of the frame, said pair of series of curved supporting fingers being maintained in supporting position when said cradle is in bundle receiving position, a second shaft journaled on said frame, and a series of curved supporting fingers carried by said second shaft and coöperating with said supporting fingers for forming a shock during movement of the cradle from bundle receiving to shock discharging position.

12. A shock forming machine including a cradle movable from the bundle receiving to the shock discharging position and consisting of a U-shaped frame, bearings carried by the sides of said frame, a shaft journaled in each of said bearings on opposite sides of the cradle, a pair of series of curved supporting fingers, the members of the pairs being each carried one by the shaft on one side of the frame and the other by the shaft on the other side of the frame, said pair of series of curved supporting fingers being maintained in supporting position when said cradle is in bundle receiving position, a second shaft journaled on said frame, and a series of curved supporting fingers carried by said second shaft and coöperating with said supporting fingers for forming a shock during movement of the cradle from bundle receiving to shock forming position, and coil springs mounted on said shafts for moving said supporting fingers into shock releasing position during the shock discharging operation.

JOHN C. RADER.